United States Patent
Downs et al.

(10) Patent No.: US 6,592,324 B2
(45) Date of Patent: Jul. 15, 2003

(54) GRIPPER MECHANISM

(75) Inventors: Robert Charles Downs, La Jolla, CA (US); Mark Richard Weselak, San Diego, CA (US)

(73) Assignee: IRM, LLC, Hamilton (BM)

( * ) Notice: Subject to any disclaimer, the term of this patent is extended or adjusted under 35 U.S.C. 154(b) by 102 days.

(21) Appl. No.: 09/793,254

(22) Filed: Feb. 26, 2001

(65) Prior Publication Data

US 2002/0117380 A1 Aug. 29, 2002

(51) Int. Cl.[7] .............................................. B25J 15/00
(52) U.S. Cl. ..................... 414/741; 414/730; 414/936; 414/941; 294/104; 294/119.1; 294/902; 901/31; 901/35; 901/39
(58) Field of Search .................. 414/730, 741, 414/744.3, 744.6, 941, 936; 901/31, 39, 35, 49; 294/119.1, 902, 104, 907, 167

(56) References Cited

U.S. PATENT DOCUMENTS

| | | | |
|---|---|---|---|
| 4,465,416 A | * 8/1984 | Burkhalter et al. | 414/217 |
| 4,662,811 A | * 5/1987 | Hayden | 414/433 |
| 4,714,865 A | * 12/1987 | Chin et al. | 318/563 |
| 4,715,637 A | * 12/1987 | Hosoda et al. | 294/86.4 |
| 4,894,103 A | * 1/1990 | Bailey | 156/111 |
| 4,923,054 A | * 5/1990 | Ohtani et al. | 414/331 |
| 4,944,650 A | * 7/1990 | Matsumoto | 414/757 |
| 4,952,115 A | * 8/1990 | Ohkase | 414/618 |
| 4,976,484 A | 12/1990 | Nomaru et al. | |
| 5,022,695 A | * 6/1991 | Ayers | 294/88 |
| 5,061,144 A | * 10/1991 | Akimoto et al. | 414/225 |
| 5,062,756 A | * 11/1991 | McArthur et al. | 414/22.51 |
| 5,100,285 A | 3/1992 | Wagner | |
| 5,162,047 A | * 11/1992 | Wada et al. | 414/404 |
| 5,192,106 A | * 3/1993 | Kaufman | 294/99.2 |
| 5,201,501 A | * 4/1993 | Fassler | 269/32 |
| 5,253,911 A | 10/1993 | Egan et al. | |
| 5,308,222 A | * 5/1994 | Bacchi et al. | 414/783 |
| 5,328,224 A | * 7/1994 | Jacobsen et al. | 294/104 |
| 5,445,486 A | * 8/1995 | Kitayama et al. | 414/416 |
| 5,541,485 A | 7/1996 | Teichmann et al. | |
| 5,543,022 A | * 8/1996 | Nguyen et al. | 204/298.15 |
| 5,549,444 A | * 8/1996 | Dubuit | 414/796.7 |
| 5,669,644 A | * 9/1997 | Kaihotsu et al. | 294/1.1 |
| 5,697,480 A | * 12/1997 | Herbermann et al. | 901/49 |
| 5,700,046 A | * 12/1997 | Van Doren et al. | 294/119.1 |
| 5,778,742 A | * 7/1998 | Stuart | 81/57.34 |
| 5,810,935 A | * 9/1998 | Lee et al. | 901/39 |
| 5,863,086 A | * 1/1999 | Christenson | 294/106 |
| 5,870,488 A | * 2/1999 | Rush et al. | 382/151 |
| 5,871,248 A | 2/1999 | Okogbaa et al. | |
| 5,944,476 A | * 8/1999 | Bacchi et al. | 414/783 |
| 5,945,798 A | 8/1999 | Stagnitto et al. | |
| 6,015,174 A | * 1/2000 | Raes et al. | 294/2 |
| 6,116,848 A | * 9/2000 | Thomas et al. | 414/754 |
| 6,305,898 B1 | * 10/2001 | Yamagishi et al. | 414/744.5 |
| 6,322,119 B1 | * 11/2001 | Schmidt et al. | 294/103.1 |
| 6,409,241 B1 | * 6/2002 | Hughes et al. | 294/99.1 |
| 6,474,712 B1 | * 11/2002 | Govzman et al. | 294/106 |

FOREIGN PATENT DOCUMENTS

| | | | | |
|---|---|---|---|---|
| EP | 0 355 866 | * | 2/1990 | 294/104 |
| GB | 2 185 458 | * | 1/1986 | 294/167 |

* cited by examiner

*Primary Examiner*—Douglas Hess
(74) *Attorney, Agent, or Firm*—Timothy L. Smith; Christopher C. Sappenfield; Quine Intellectual Property Law Group, P.C.

(57) ABSTRACT

A gripper apparatus for grasping an object such as a specimen holder. The gripper apparatus comprises two arms. In one embodiment the arms are pivotable, and in a second embodiment, each arm includes a pivotable member. The arms are moveably coupled to each other and are structured to grasp the object therebetween.

60 Claims, 7 Drawing Sheets

GRIPPER MECHANISM

FIELD OF THE INVENTION

The present invention generally relates to robotic gripping devices. More particularly, the invention concerns a method and apparatus to grasp an object using a pair of arms. In a preferred embodiment, the present invention grasps and transports specimen plates employed in a high throughput screening system.

BACKGROUND OF THE INVENTION

Robotic devices of myriad shapes and sizes have been constructed to perform tasks considered either too dangerous or too dreary to be performed by a person. Simple repetitive tasks, which drive human operators to distraction and error, can be performed faultlessly and quickly by robots. However, constructing a robotic system to seamlessly perform the grasping and precise positioning of objects is not a trivial task.

Many industrial fields require the precise positioning of an object for automated processing. In particular, the biotechnology field is making rapid advances by transitioning from traditional laboratory bench top processes to more automated systems. These automated systems typically perform assays or screens using a specimen or sample plate. Each sample plate has many individual sample wells, ranging from hundreds to more than a thousand wells. Because a discrete test can be conducted in each sample well, hundreds, or thousands, of tests can be performed using a few plates.

Sample plates are used in several industries, such as the biotechnology and biomedical industries. A sample plate typically has multiple sample wells on its top surface into which one or more samples can be placed, although a particular plate may have only a single well for the entire plate. Each of the wells forms a container into which a sample is placed. For example, some commonly used sample plates have 96, 384, or 1,536 wells. Such plates are available from, for example, Greiner America Corp. of Lake Mary, Fla., U.S.A. These plates may be handled manually or robotically.

For a robotic or automated system to perform with a high degree of reliability and repeatability, the system needs to accurately, quickly, and reliably position individual sample plates for processing. For example, sample plates must be placed precisely under liquid dispensers to enable the liquid dispenser to deposit samples or reagents into the correct sample wells. A positioning error of only a few thousandths of an inch can result in a sample or reagent being dispensed into a wrong sample well. Such a mistake can not only lead to a failed test, but such a mistake can lead to incorrect test results which others may rely upon for critical decision making, such as a medical treatment path for a patient. Further, even a minor positioning error may cause a needle or tip of the liquid dispenser to crash into a wall or other surface, thereby damaging the liquid dispenser.

Current, conventional automated or robotic devices are not known to operate with sufficient positioning accuracy to reliably and repeatably position a high-density sample plate for automated processing. For example, typical conventional robotic systems generally achieve a positioning tolerance of about 1 mm. Although such a tolerance is adequate for some low density sample plates, such a tolerance is unacceptable for high density plates, such as a plate with 1536 wells. Indeed, a positioning error of 1 mm for a 1536 well sample plate could cause a sample or reagent to be deposited entirely in the wrong well, or cause damage to the system, such as to needles or tips of the liquid dispenser.

Therefore, there exists a need for a robotic or otherwise automated gripper mechanism that can accurately, reliably, and quickly position an object for processing in an automated system.

SUMMARY OF THE INVENTION

In order to overcome the deficiencies with known, conventional robotic devices, a robotic gripping mechanism is provided. Briefly, the gripper mechanism includes a first arm having a first pivotable member and a second arm also having a second pivotable member, with the second arm moveably coupled to the first arm. The first and second pivotable members are structured to grasp an object therebetween. In an alternative embodiment, the pivotable members are removed, and the first and second arms are pivotable so that the edges of an object, such as a sample plate, contacts the first and second arms.

The robotic gripper mechanism according to the invention provides an accurate, extremely precise automated system for grasping, moving and positioning objects. The gripper mechanism accomplishes the accurate positioning of objects by positively locating the grasped object in all three translational coordinate axes. For example, one method employed by the present invention comprises grasping the object with two arms that include pivot members. During the grasping process, the x-axis, or side-to-side position of the object is determined. The z-axis, or vertical position of the object is also determined during the grasping process. Finally, the object is then pushed against a surface to determine a y-axis, or fore-and-aft position the object.

The gripping mechanism of the present invention affords its users with a number of distinct advantages. First, unlike prior robotic grippers, the present gripping mechanism accurately determines the three translational axes of an object with extreme accuracy. Moreover, the determination of the position of the object is performed quickly, thereby enabling high throughput processing of a large quantity of objects.

In one aspect, the present invention features a robotic gripper apparatus. The gripper apparatus includes a grasping mechanism coupled to a controller. The grasping mechanism includes a first arm and a second arm. The gripper apparatus determines the position of an object in all three translational coordinate axes with an accuracy of about 0.1 millimeters in each direction and the gripper apparatus also grasps the object.

In a preferred embodiment the robotic gripper apparatus includes: (a) a first arm including a first pivotable member; and (b) a second arm including a second pivotable member, the second arm moveably coupled to the first arm; wherein the first and second pivotable members are structured to grasp the object therebetween.

In another aspect, the invention provides a robotic gripper apparatus for grasping an object that includes: (a) means for providing first and second arms; (b) means for grasping the object with the first and second arms; and (c) means for pushing the object against a surface to position the object relative to the first and second arms.

In yet another aspect, the invention features a method of grasping an object. The method involves the steps of using a robotic gripper apparatus to determine all three translational coordinate axes of the object with an accuracy of about 0.1 millimeters in each direction and of using the robotic gripper apparatus to grasp the object. The gripper apparatus includes a grasping mechanism coupled to a controller, and the grasping mechanism includes a first arm and a second arm.

In a preferred embodiment, the method involves the steps of: (a) providing first and second arms; (b) grasping the object with the first and second arms; and (c) pushing the object against a surface to position the object relative to the first and second arms.

Finally, another aspect of the invention provides a method of moving an object. The method involves the steps of: (a) approaching the object with a robotic gripper apparatus; (b) grasping the object with the gripper apparatus; (c) removing the object from an initial position with the gripper apparatus; (d) pressing the object against a push surface with the gripper apparatus; and (e) placing the object in a new position with the gripper apparatus.

BRIEF DESCRIPTION OF THE DRAWINGS

The nature, goals, and advantages of the invention will become more apparent to those skilled in the art after considering the following detailed description when read in connection with the accompanying drawing in which like reference numerals identify like elements throughout wherein:

FIG. 6A is an elevation view of the pivot members and sample plate illustrated in FIG. 6.

Some or all of the Figures may be schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiments and examples should not be considered as limitations on the present invention. As used herein, "the present invention" and "the invention" refers to any one of the herein described embodiments.

I. A Robotic Gripper Apparatus

In accordance with the present invention, a robotic gripper apparatus (also referred to herein as a robotic gripper mechanism) is provided. Although this disclosed example is designed to be employed with a specific high throughput system, other uses for the present invention are contemplated. In particular, other high throughput systems may utilize the robotic gripper mechanism. Also, the robotic gripper mechanism can be employed to assemble components requiring precise positioning such as electronic devices, medical devices or other devices.

Figure 1:
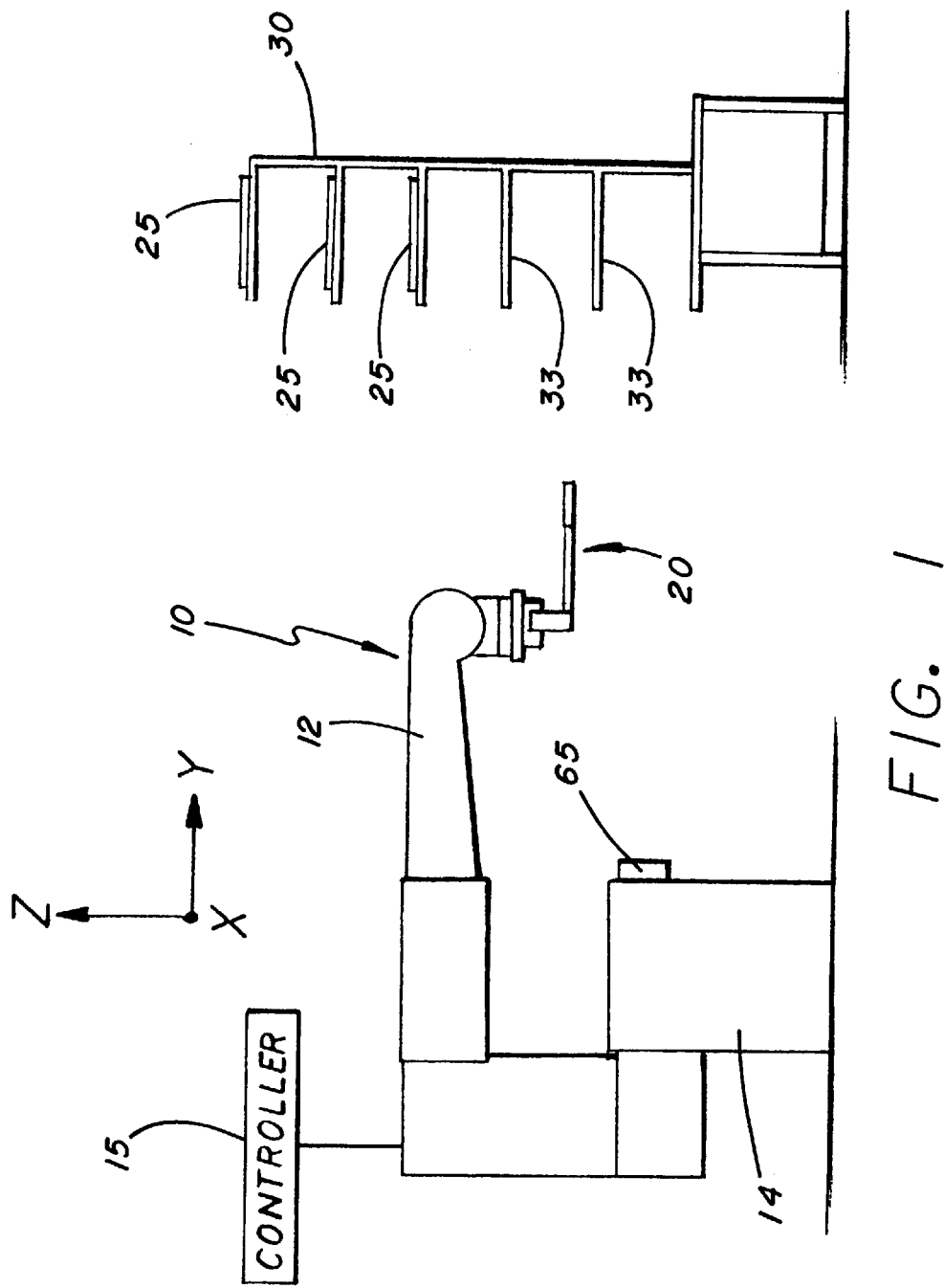
FIG. 1 is an elevation view of a robotic arm gripper mechanism constructed according to one embodiment of the present invention.

Referring to FIG. 1, the robotic gripper mechanism in accordance with one embodiment of the invention is illustrated and designated generally by the numeral 10. The robotic gripper mechanism 10 is an automated and robotic gripper for grasping, moving and positioning objects. The preferred embodiment is constructed to grasp sample plates, but other types of objects can be grasped by the robotic gripper mechanism 10. For example, petri dishes, test tubes, vials, crucibles, reaction vessels or flasks, or any type of object that is employed in a process requiring accurate positioning.

In the preferred embodiment illustrated in FIG. 1, the robotic gripper 10 comprises a grasping mechanism 20 movably connected to a boom 12 that is movable relative to a base 14. Controller 15, comprising a general purpose computing device, controls the movements of the grasping mechanism 20 and the boom 12 in a work perimeter that includes one or more stations 30 that can receive sample plates 25. The grasping mechanism 20 is designed to grasp the sample plates 25 and move them from one station 30 to another station 30 or to other locations within the work perimeter of the robotic gripper mechanism 10. Although the disclosed example has one work perimeter, more work perimeters, each employing a robotic gripper mechanism 10, may be utilized, depending upon the specific application.

Referring again to FIG. 1, the boom 12 is capable of about 360 degrees of rotation. In addition, the boom 12 can move vertically and horizontally to align the grasping mechanism 20 with higher or lower stations 30. In a preferred embodiment, a Stäubli RX-60 robot provided by Stäubli Corporation of South Carolina, U.S.A. comprises the boom 12 and base 14, but any type of robot can be used by the robotic gripper mechanism 10.

The boom 12 is configured to extend and retract from the base 14. This defines the work perimeter for the robotic gripper mechanism 10. Stations 30 are positioned within the work perimeter of the boom 12 as are hand-off areas or other areas that are configured for receiving objects grasped and moved by the grasping mechanism 20. For example, sample plate 25 is positioned on station shelf 33 and can be grasped by grasping mechanism 20 and moved to another position by boom 12. In a preferred embodiment, the sample plate 25 comprises several individual wells, with each well configured to hold a sample. For example, a sample plate 25 may contain 384, 967, or 1,536 wells. The grasping mechanism 20 can grasp many other types of sample plates. Other types of devices, such as semiconductor wafers, CDs, medical devices and other items, may be grasped and moved by the grasping mechanism 20.

Figure 2:
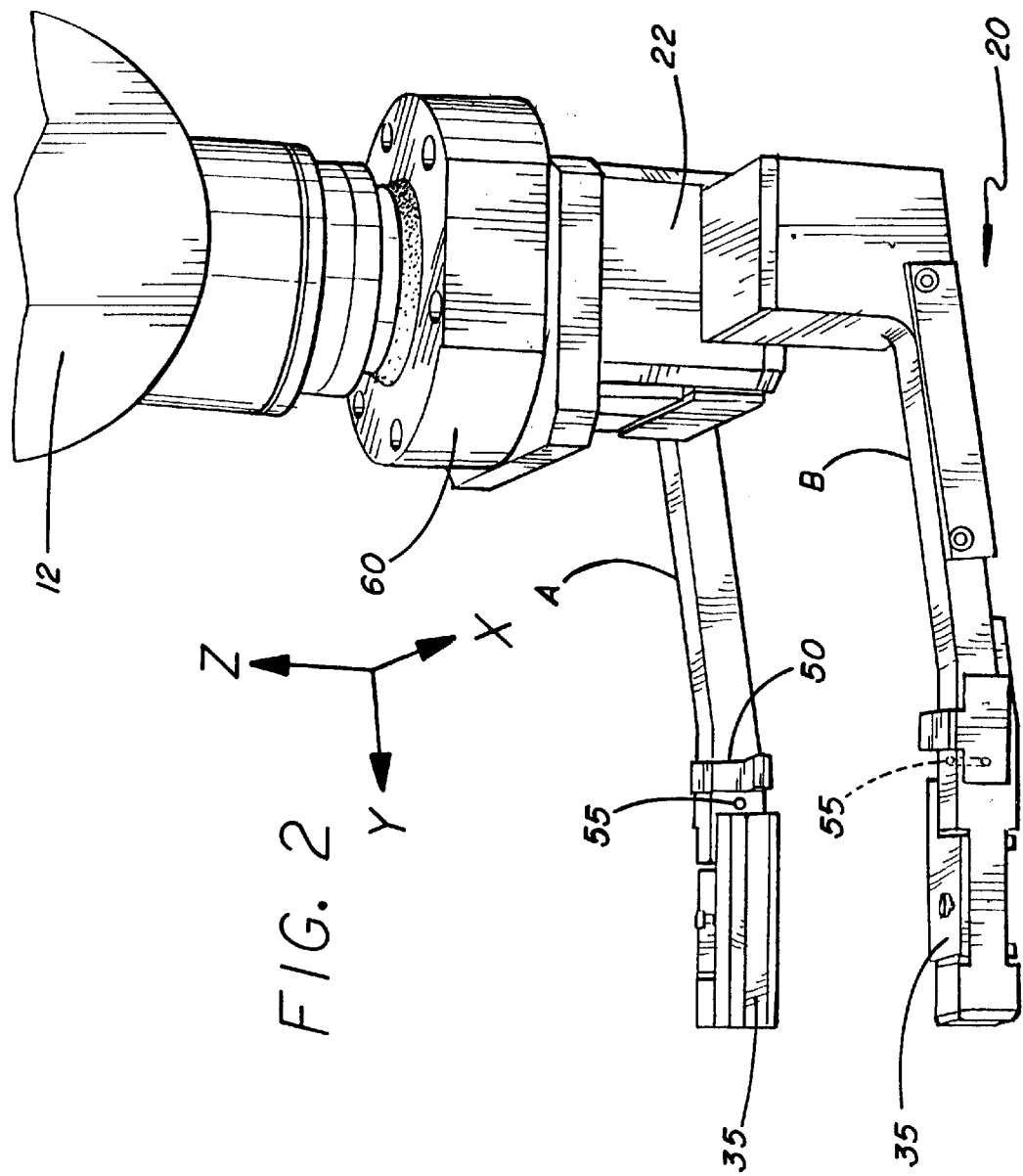
FIG. 2 is a perspective view of the gripper mechanism illustrated in FIG. 1.
Figure 3:
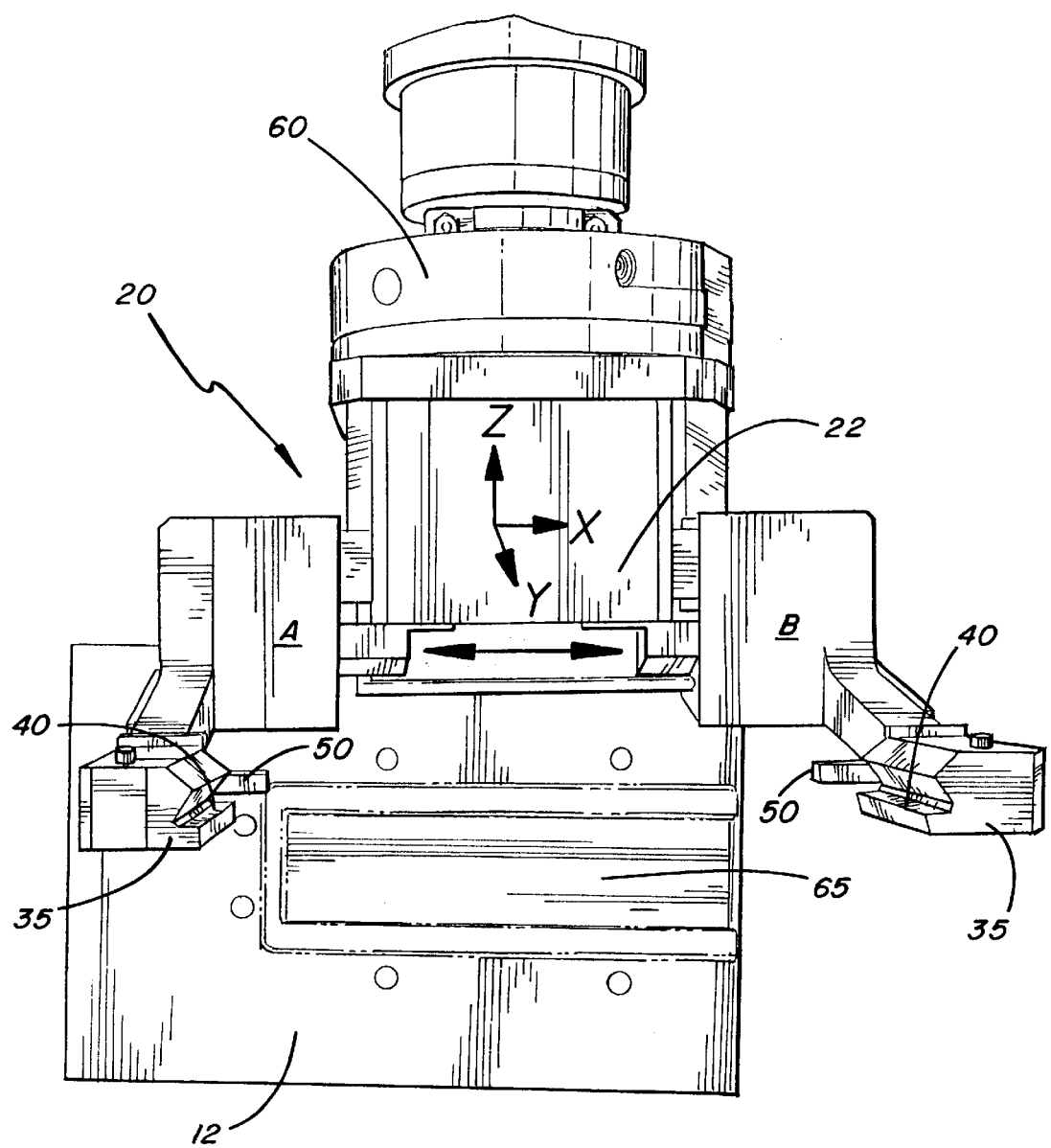
FIG. 3 is an elevation view of the gripper mechanism illustrated in FIG. 2.

Referring to FIGS. 2–3, the grasping mechanism 20 is illustrated. Grasping arm A and grasping arm B extend from gripper mechanism body 22. The body 22 is connected to a breakaway 60 that is deflectably coupled to the boom 12. The breakaway is structured to detect angular, rotational and compressive forces encountered by the grasping mechanism 20. The breakaway acts a collision protection device that greatly reduces the possibility of damage to components within the work perimeter by the accidental impact of the grasping mechanism 20 or grasping arms A and B with objects. For example, when the grasping mechanism 20 impacts an object, the breakaway 60 will deflect, thereby also causing the grasping mechanism 20 to deflect. When the controller 15 detects the deflection, it stops movement of the robotic gripper mechanism. In a preferred embodiment, the breakaway is a "quickstop" collision sensor manufactured by Applied Robotics of Glenville, N.Y., U.S.A. The breakaway 60 is a dynamically variable collision sensor that operates on an air pressure system. Other types of impact detecting devices could be employed and they can be operated hydraulically, magnetically, or by other means known in the art.

Body 22 connects the grasping arms A and B to the breakaway 60. When directed by the controller 15, the body 22 moves the grasping arms A and B, away from or toward each other, to grasp and release objects. In a preferred embodiment, the body 22 is a gripper manufactured by Robohand of Monroe, Conn., U.S.A. In a preferred embodiment, the gripper is pneumatically driven, but other means for operating the gripper can be employed, such as magnetics and hydraulics.

Referring to FIG. 2, grasping arms A and B extend from the body 22 and include pivot members 35. Positioned adjacent to the pivot members 35 are sensors 55 and stops 50. The sensors 55 communicate with the controller 15 and determine the location of objects adjacent to the arms A and B. In a preferred embodiment, the sensors 55 are optical sensors, but photoelectric, infrared, magnetic, or other suitable sensors can be employed.

Figure 4:
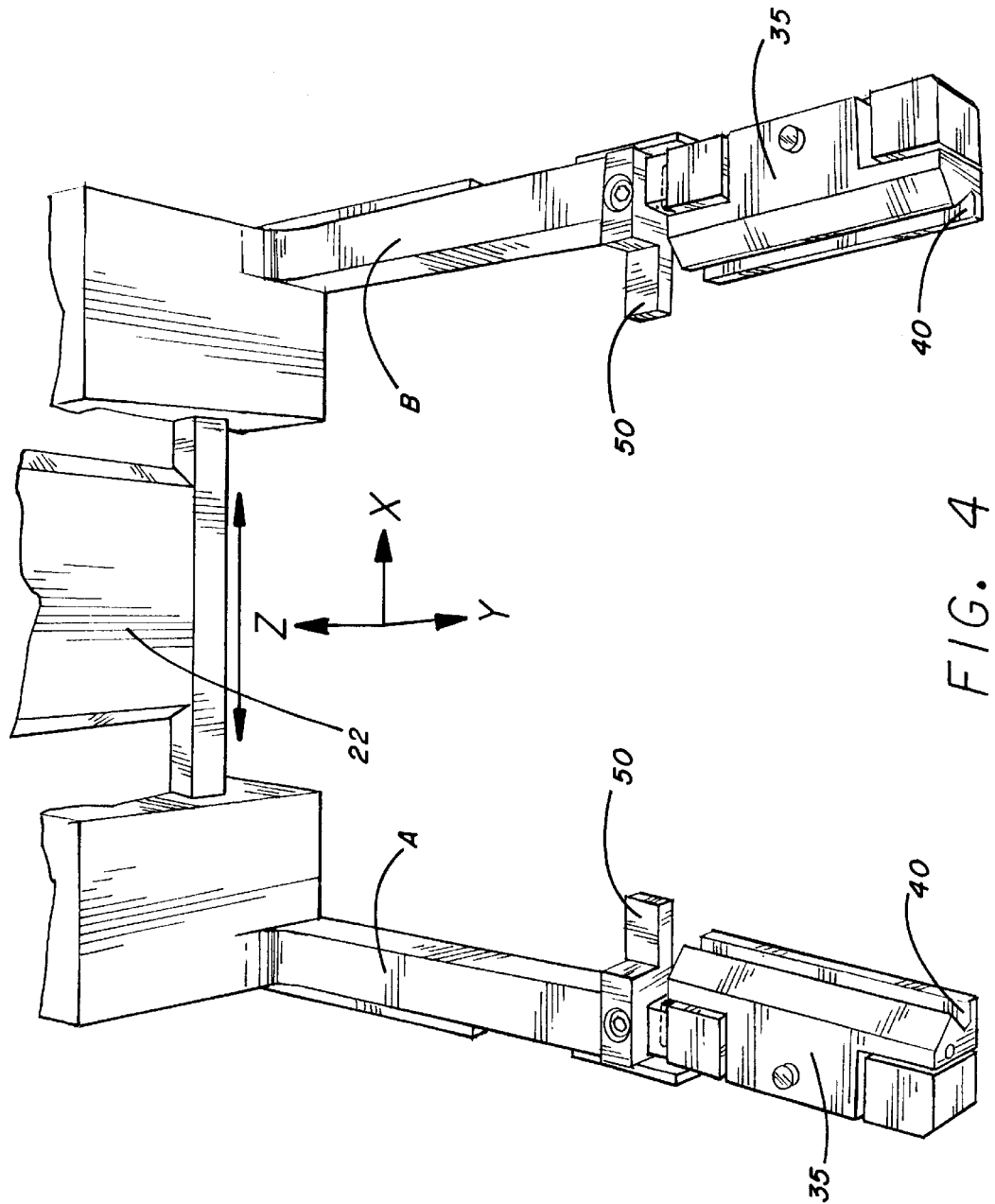
FIG. 4 is a plan view of the gripper mechanism illustrated in FIG. 2.
Figure 6:
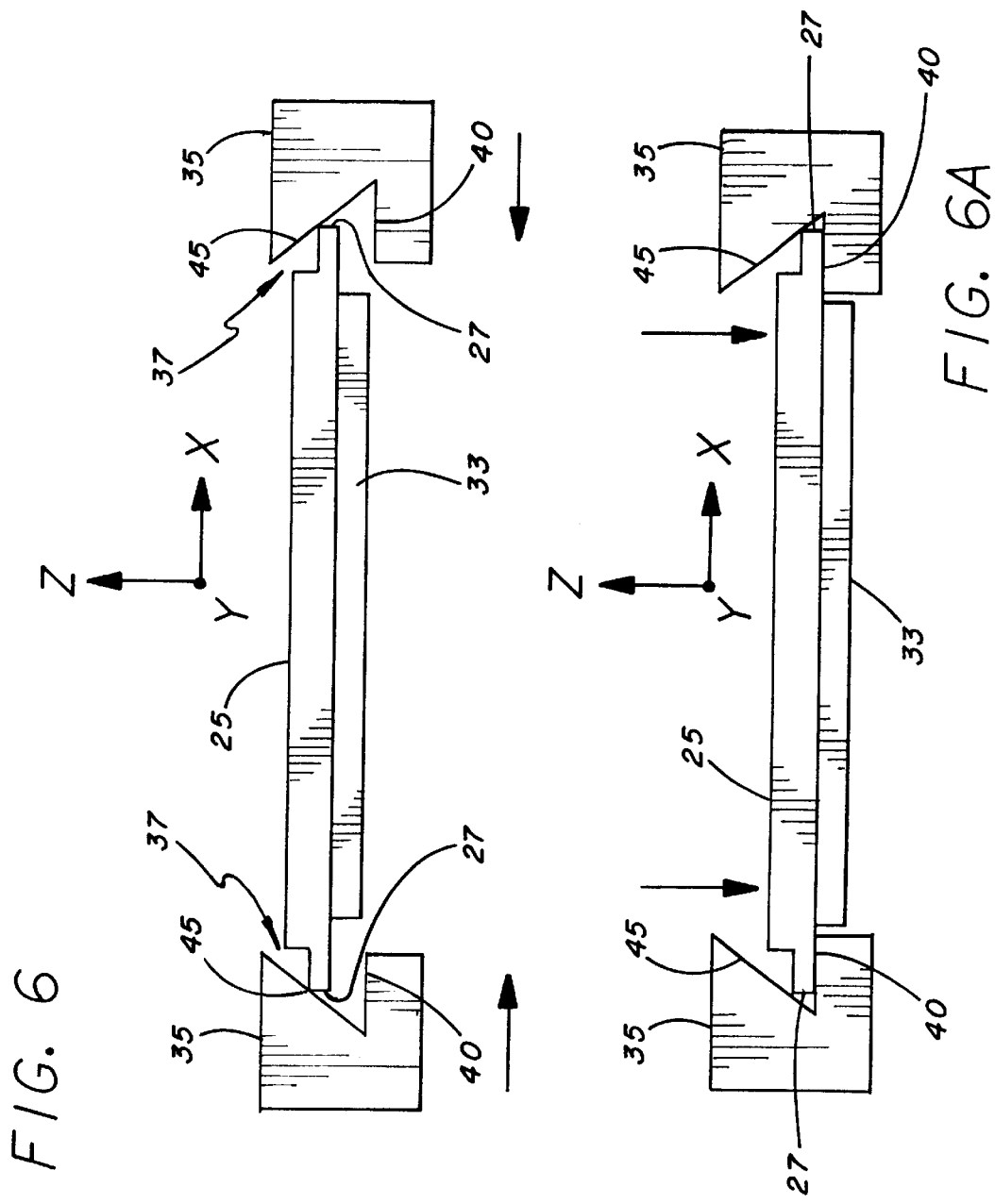
FIG. 6 is an elevation view of the pivot members and sample plate illustrated in FIG. 5.

Referring to FIGS. 4 and 6–6A, the pivoting members 35 are pivotally mounted to the arms A and B. A channel 37 extends along a long axis of each pivot member 35 and, as shown in FIG. 6, includes a horizontal surface 40 and an angled surface 45. In a preferred embodiment, the pivot members 35 comprise separate pieces which are pivotally mounted to the arms A and B. An alternative embodiment robotic gripper mechanism 10 may employ grasping arms A and B that include channels 37 in the arms A and B. The arms A and B would pivot with respect to the body 22, thereby eliminating the need for separate pivot members 35. The grasping arms A and B and pivot members 35 preferably are constructed from a metal or alloy, such as aluminum, but dielectric materials, such as plastic or other types of materials, can be employed.

II. Method of Using a Robotic Gripper Apparatus

Figure 5:
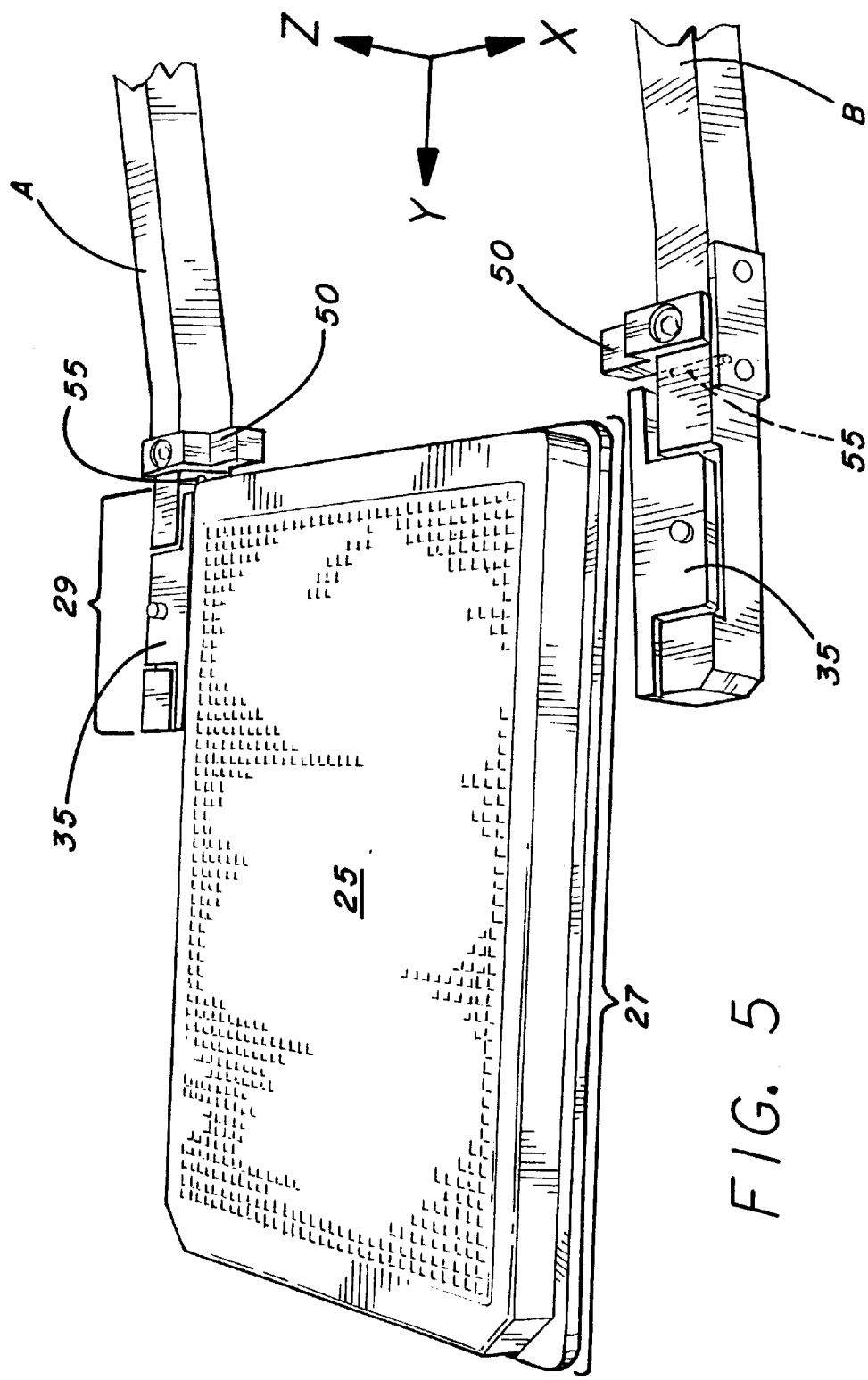
FIG. 5 is a perspective view of the gripper mechanism and sample plate illustrated in FIGS. 1 and 2.
Figure 7:
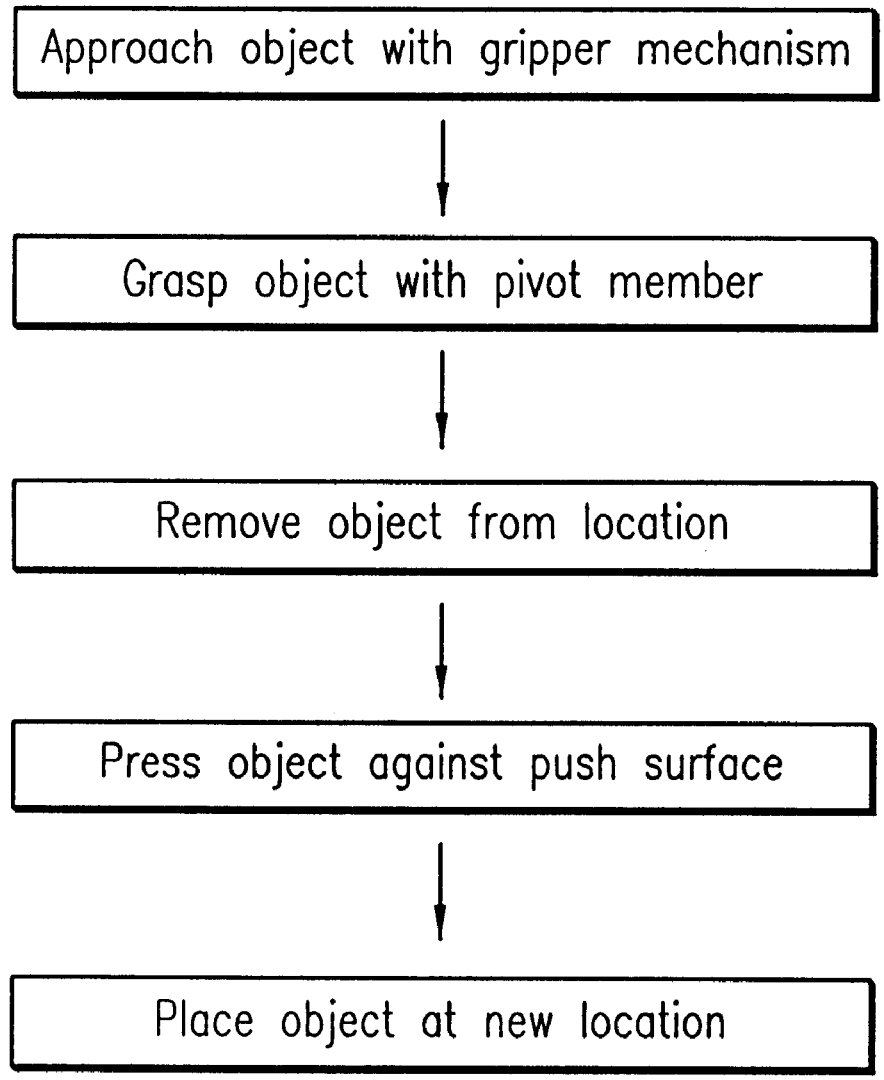
FIG. 7 is a block diagram illustrating one method of grasping an object with the gripper mechanism illustrated in FIG. 1.

Referring to FIGS. 5–7, the operation of the robotic gripper mechanism 10 will now be described. In a preferred embodiment, the robotic gripper mechanism 10 grips, transports and positions sample plates 25 from a station 30 to another station 30 or to a hand-off area or to another location within the work perimeter of the robotic gripper mechanism 10. As shown in FIG. 5, the sample plate 25 comprises a plurality of closely arranged sample wells. Each well in the sample plate 25 is square with each side of the well having a length of about 2 millimeters. During a high throughput process, discrete fluid samples may be deposited in each well, requiring positioning accuracy to within 0.1 millimeters. The robotic grasping mechanism 10 of the present invention is capable of this positioning accuracy.

When employed in a high throughput process, the controller 15 instructs the robotic gripper mechanism 10 to move the boom 12 toward a station 30. In a preferred embodiment, the sample plates 25 are vertically arranged on station shelves 33. When instructed by controller 15, the boom 12 extends the grasping mechanism 20 toward the station 30 and between the station shelves 33. Sample plates 25 are located on the station shelves 33 and the sensor 55 detects the station shelf 33 as the grasping mechanism 20 moves closer to the station shelf 33. As shown in FIG. 5, when the station shelf 33 is detected, the grasping arms A and B move up and contact the sample plate edge 27 with the pivot members 35. A preferred embodiment sample plate 25 is substantially rectangular with at least two substantially straight sample plate edges 27. Other objects may be grasped by the grasping mechanism 20. The objects preferably will have straight sections that can engage the pivot members 35. The pivot members 35 alternatively may be curved to include a curved channel 37, suitable for grasping curved objects.

Referring to FIGS. 6 and 6A, the pivot members 35 comprise a substantially horizontal surface 40 and an angle surface 45 that combine to form a channel 37. As the pivot members 35 approach the sample plate 25, the vertical position of the sample plates 25, defined by the z-axes, may not correspond with the pivot members 35. In this case, when the pivot member 35 engages the sample plate edge 27, the edge 27 may contact the angled surface 45. As the grasping arms A and B continue to compress together, the grasping arms A and B pivot slightly, pushing the sample plate 25 against the horizontal surface 40. By including the angled surface 45 on the pivot members 35, the vertical position, as defined by the z-axis, is always known because the angled surface 45 forces the sample plate 25 to engage the horizontal surface 40. This is in contrast to conventional gripping devices that do not define the vertical position of the grasped object. In addition, with conventional grasping devices, an object that is misaligned relative to the x-axes, that is, angled relative to the conventional grasping device, will be grasped at an angle, thereby only establishing a single point of contact on each side of the object.

As illustrated in FIGS. 5 and 6A, the present invention employs pivot members 35 that pivot to align themselves with the sample plate edge 27, thereby establishing a line of contact 29 with the sample plate edge 27. By including pivot members 35 on the grasping arms A and B, the present invention establishes an extremely accurate side-to-side position, or x-axis position of the sample plate 25. Grasping angled plates with the subsequent mispositioning of the angled plate is thereby eliminated.

The next step of positioning the sample plate 25 comprises removing the sample plate 25 from the station shelf 33. Because of the unique geometry of the channel 37 located in the pivot members 35, the position of the sample plate 25 on the x-axis and the z-axis is known. The y-axis, or fore-and-aft position of the sample plate 25, however, is not known. To determine the y-axis of the sample plate 25, the body 22 and boom 12 of the robotic gripper mechanism 10 are moved to position the sample plate 25 next to the push surface 65.

Shown in FIGS. 1 and 3, the push surface 65 is positioned on the base 14 of the robotic arm gripper mechanism 10. The push surface 65 can be located in other locations such as on the station 30 or on other locations that are within the work perimeter of the robotic gripper mechanism 10. The boom 12 pushes the sample plate 25 against the push surface 65 pushing the sample plate 25 against the stops 50 located on the grasping arms A and B. By pushing the sample plate 25 against the stops 50, the fore-and-aft position of the sample plate is now known.

The above-described process of grasping the sample plate 25 with the pivot members 35 so that the sample plate is forced against the horizontal surface 40 and then removing the sample plate from the work stations 30 and pushing it against the push surface 65 ensures that all three translational axes of the sample plate can be determined to within about 0.1 millimeters. In addition, the channel 37 reduces the amount of gripping force required to grasp the sample plate 25 because the sample plate 25 rests on the substantially horizontal surface 40. Moreover, because the angled surface 45 traps the sample plate 25 against the horizontal surface 40, thereby preventing the tilting of the sample plate 25, only the end section of the sample plate 25 is grasped. This allows the easy insertion of the sample plate 25 into constrained locations, because the grasping arms A and B only engage a small section of the sample plate 25.

An apparatus and method for grasping and positioning an object, such as the robotic gripper mechanism, are thus provided. One skilled in the art will appreciate that the present invention can be practiced by other than the preferred embodiments, which are presented in this description for purposes of illustration and not of limitation, and the present invention is limited only by the claims that follow. It is noted that the practice of various equivalents for the particular embodiments discussed in this description is also within the scope of the invention.

What is claimed is:

1. A grasping mechanism, comprising moveably coupled aims that are structured to grasp an object, wherein at least one arm comprises a pivot member having a support surface to support the object and a height adjusting surface that pushes the object into contact with the support surface when the arms grasp the object.

2. The grasping mechanism of claim 1, wherein the grasping mechanism comprises two moveably coupled arms.

3. The grasping mechanism of claim 1, wherein each arm comprises the pivot member.

4. The grasping mechanism of claim 1, wherein the arms extend from a body of the grasping mechanism.

5. The grasping mechanism of claim 1, wherein the support surface and the height adjusting surface form a channel to grasp the object.

6. The grasping mechanism of claim 1, wherein the support surface comprises a substantially horizontal surface.

7. The grasping mechanism of claim 1, wherein the height adjusting surface comprises an angled surface.

8. The grasping mechanism of claim 1, further comprising the object.

9. The grasping mechanism of claim 8, wherein the object is selected from the group consisting of: a plate, a sample plate, a sample holder, a petri dish, a test tube, a vial, a crucible, a reaction vessel, a reaction flask, a semi conductor wafer, a CD, and a tray.

10. The grasping mechanism of claim 1, wherein the object is grasped between the arms.

11. The grasping mechanism of claim 1, wherein one or more of the anus further comprise a stop that determines a y-axis position of the object when the grasping mechanism pushes the object against a push surface.

12. The grasping mechanism of claim 11, wherein the y-axis position of the object is determined with an accuracy to within 0.1 millimeters.

13. The grasping mechanism of claim 1, wherein the support surface determines an x-axis position of the object and the height adjusting surface determines a z-axis position of the object when the arms grasp the object.

14. The grasping mechanism of claim 13, wherein the x-axis and z-axis positions of the object are determined with an accuracy to within 0.1 millimeters.

15. The grasping mechanism of claim 1, wherein the grasping mechanism is moveably connected to a boom, which boom is moveably connected to a base.

16. The grasping mechanism of claim 15, wherein the boom rotates about 360 degrees.

17. The grasping mechanism of claim 15, wherein the base comprises at least one push surface.

18. The grasping mechanism of claim 15, wherein the boom and the base comprise a robot.

19. The grasping mechanism of claim 15, wherein the boom moves vertically and horizontally.

20. The grasping mechanism of claim 15, wherein the boom extends and retracts.

21. The grasping mechanism of claim 15, further comprising a controller coupled to the grasping mechanism, which controller controls movement of the grasping mechanism.

22. The grasping mechanism of claim 21, wherein the controller further controls movement of the boom.

23. The grasping mechanism of claim 21, further comprising at least one sensor that communicates with the controller to determine a location of the gripper mechanism relative to the object.

24. The grasping mechanism of claim 15, further comprising a deflectable member that deflectively couples the grasping mechanism to the boom, which deflectable member deflects when the grasping mechanism contacts an item with a force greater than a preset force.

25. The grasping mechanism of claim 24, wherein the deflectable member comprises a breakaway.

26. A gripper apparatus, comprising
    a grasping mechanism comprising moveably coupled anus that are structured to grasp an object, wherein at least one arm comprises a pivot member that pivots, separately from movement of the arm, to align with the object when the antis grasp the object;
    a boom moveably connected to a base, wherein the grasping mechanism is moveably connected to the boom;
    a controller coupled to the grasping mechanism, which controller controls movement of the grasping mechanism; and,
    at least one sensor that communicates with the controller to determine a location of the grasping mechanism relative to the object.

27. The gripper apparatus of claim 26, wherein the grasping mechanism comprises two moveably coupled arms.

28. The gripper apparatus of claim 21, wherein each arm comprises the pivot member.

29. The gripper apparatus of claim 26, wherein the object is grasped between the arms.

30. The gripper apparatus of claim 26, wherein one or more of the arms further comprise a stop that determines a y-axis position of the object when the grasping mechanism pushes the object against a push surface.

31. The gripper apparatus of claim 30, wherein the y-axis position of the object is determined with an accuracy to within 0.1 millimeters.

32. The gripper apparatus of claim 26, wherein the boom and the base comprise a robot.

33. The gripper apparatus of claim 21, wherein the boom moves vertically and horizontally.

34. The gripper apparatus of claim 26, wherein the boom extends and retracts.

35. The gripper apparatus of claim 26, wherein the controller further controls movement of the boom.

36. The gripper apparatus of claim 26, further comprising a deflectable member that deflectively couples the grasping mechanism to the boom, which deflectable member deflects when the grasping mechanism contacts an item with a force greater than a preset force.

37. The gripper apparatus of claim 36, wherein the deflectable member comprises a breakaway.

38. The grasping mechanism of claim 26, further comprising the object.

39. The gripper apparatus of claim 38, wherein the object is selected from the group consisting of: a plate, a sample plate, a sample holder, a petri dish, a test tube, a vial, a crucible, a reaction vessel, a reaction flask, a semi conductor wafer, a CD, and a tray.

40. A gripper apparatus, comprising:
   a grasping mechanism comprising moveably coupled arms that are structured to grasp an object, wherein at least one arm comprises a pivot member having a support surface to support the object and a height adjusting surface that pushes the object into contact with the support surface when the arms grasp the object to determine an x-axis position and a z-axis position of the object, and wherein one or more of the arms comprise a stop;
   a controller coupled to the grasping mechanism, which controller controls movement of the grasping mechanism; and,
   at least one push surface against which the grasping mechanism pushes the object into contact with the stop to determine a y-axis position of the object.

41. The gripper apparatus of claim 40, wherein each arm comprises the stop.

42. The gripper apparatus of claim 40, wherein the grasping mechanism is moveably connected to a boom, which boom is moveably connected to a base.

43. The gripper apparatus of claim 42, wherein the controller further controls movement of the boom.

44. The gripper apparatus of claim 42, wherein the base comprises the push surface.

45. A method of determining three translational axis positions of an object, the method comprising:
   providing a gripper apparatus that comprises a controller coupled grasping mechanism comprising moveably coupled arms that are structured to grasp an object, wherein at least one arm comprises a pivot member having a support surface and a height adjusting surface and wherein one or more of the arms comprise a stop;
   providing at least one push surface;
   grasping at least a section of the object with the arms such that the height adjusting surface pushes the object into contact with the support surface to determine an x-axis position and a z-axis position of the object; and,
   pushing the object against the push surface and into contact with the stop, using the gripper apparatus, to determine a y-axis position of the object, thereby determining the three translational axis positions of the object.

46. The method of claim 45, further comprising placing the object at a new location.

47. A gripper apparatus, comprising:
   a grasping mechanism comprising moveably coupled arms that are structured to grasp an object, wherein at least one arm comprises a pivot member that pivots, separately from movement of the arm, to align with the object when the antis grasp the object;
   a boom moveably connected to a base, wherein the grasping mechanism is moveably connected to a boom; and,
   a deflectable member that deflectively couples the grasping mechanism to the boom, which deflectable member deflects when the grasping mechanism contacts an item with a force greater than a preset force.

48. The gripper apparatus of claim 47, wherein the grasping mechanism comprises two moveably coupled arms.

49. The gripper apparatus of claim 47, wherein each arm comprises the pivot member.

50. The gripper apparatus of claim 47, wherein the object is grasped between the arms.

51. The gripper apparatus of claim 47, wherein the boom and the base comprise a robot.

52. The gripper apparatus of claim 47, wherein the boom moves vertically and horizontally.

53. The gripper apparatus of claim 47, wherein the boom extends and retracts.

54. The gripper apparatus of claim 47, wherein the deflectable member comprises a breakaway.

55. The gripper apparatus of claim 47, further comprising a controller coupled to the grasping mechanism, which controller controls movement of the grasping mechanism.

56. The gripper apparatus of claim 55, wherein the controller further controls movement of the boom.

57. The gripper apparatus of claim 47, wherein one or more of the arms further comprise a stop that determines a y-axis position of the object when the grasping mechanism pushes the object against a push surface.

58. The gripper apparatus of claim 57, wherein the y-axis position of the object is determined with an accuracy to within 0.1 millimeters.

59. The gripper apparatus of claim 47, further comprising the object.

60. The gripper apparatus of claim 59, wherein the object is selected from the group consisting of: a plate, a sample plate, a sample holder, a petri dish, a test tube, a vial, a crucible, a reaction vessel, a reaction flask, a semi conductor wafer, a CD, and a tray.

* * * * *

UNITED STATES PATENT AND TRADEMARK OFFICE
CERTIFICATE OF CORRECTION

PATENT NO. : 6,592,324 B2  Page 1 of 1
DATED : July 15, 2003
INVENTOR(S) : Robert Charles Downs et al.

It is certified that error appears in the above-identified patent and that said Letters Patent is hereby corrected as shown below:

Column 7,
Line 22, delete "aims" and insert -- arms --
Line 51, delete "anus" and insert -- arms --

Column 8,
Line 27, delete "anus" and insert -- arms --
Line 30, delete "antis" and insert -- arms --
Line 43, delete "21" and insert -- 26 --
Line 56, delete "21" and insert -- 26 --

Column 10,
Line 8, delete "antis" and insert -- arms --

Signed and Sealed this

Eleventh Day of November, 2003

JAMES E. ROGAN
*Director of the United States Patent and Trademark Office*